(12) United States Patent
Atsuta et al.

(10) Patent No.: US 8,203,787 B2
(45) Date of Patent: Jun. 19, 2012

(54) OPTICAL DEVICE, TWO-PLATE UNIT, IMAGING INSTRUMENT, AND ENDOSCOPE EQUIPPED WITH OPTICAL DEVICE

(75) Inventors: Takahiro Atsuta, Hachioji (JP); Kei Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 1185 days.

(21) Appl. No.: 11/820,585

(22) Filed: Jun. 19, 2007

(65) Prior Publication Data

US 2008/0007834 A1 Jan. 10, 2008

(30) Foreign Application Priority Data

Jul. 6, 2006 (JP) .................................. 2006-186489

(51) Int. Cl.
*G02B 5/30* (2006.01)
(52) U.S. Cl. .............................. 359/485.03; 359/485.06
(58) Field of Classification Search ......................... None
See application file for complete search history.

(56) References Cited

U.S. PATENT DOCUMENTS

| | | | | |
|---|---|---|---|---|
| 5,648,870 | A * | 7/1997 | Mistutake | 359/487 |
| 5,912,762 | A * | 6/1999 | Li et al. | 359/352 |
| 2001/0033423 | A1* | 10/2001 | Araki et al. | 359/629 |
| 2006/0028726 | A1* | 2/2006 | Ushigome | 359/500 |

FOREIGN PATENT DOCUMENTS

| | | | |
|---|---|---|---|
| JP | 62-187802 | | 8/1987 |
| JP | 07-020306 | | 1/1995 |
| JP | 07005307 A | * | 1/1995 |
| JP | 08-110406 | | 4/1996 |
| JP | 09-005518 | | 1/1997 |
| JP | 09-189892 | | 7/1997 |
| JP | 11-101913 | | 4/1999 |
| JP | 2000-227510 | | 8/2000 |
| JP | 2003-014932 | | 1/2003 |
| JP | 2004-163714 | | 6/2004 |
| JP | 3679746 | | 5/2005 |

* cited by examiner

*Primary Examiner* — Lee Fineman
(74) *Attorney, Agent, or Firm* — Kenyon & Kenyon LLP

(57) ABSTRACT

An optical device includes a first optical member and a second optical member formed of a medium having a refractive index greater than 1, and a multiple layer film section. The multiple layer film section has a structure in which at least two types of thin film layers namely a first thin film layer and a second thin film layer which has a refractive index higher than a refractive index of the first thin film layer, are stacked alternately. The first optical member and the second optical member are joined by an adhering means (an adhesive), and satisfy a predetermined condition. At the multiple layer film section, from a light incident, a light in a first wavelength band is let to be reflected, and a light in a second wavelength band which is shorter than the first wavelength band, and a light in a third wavelength band which is longer than the first wavelength band is let to pass (to be transmitted).

10 Claims, 19 Drawing Sheets

OPTICAL DEVICE, TWO-PLATE UNIT, IMAGING INSTRUMENT, AND ENDOSCOPE EQUIPPED WITH OPTICAL DEVICE

CROSS-REFERENCE TO RELATED APPLICATION

The present application is based upon and claims the benefit of priority from the prior Japanese Patent Application No. 2006-186489 filed on Jul. 6, 2006; the entire contents of which are incorporated herein by reference.

BACKGROUND OF THE INVENTION

1. Field of the Invention

The present invention relates to an optical device which includes an optical thin-film filter, and an optical instrument such as an imaging instrument and an endoscope, which includes this optical device.

2. Description of the Related Art

Various optical devices have hitherto been known as an optical device which includes an optical thin-film filter.

A structure which is proposed as one of the optical devices is a notch filter having 45 degree angle of incidence, which reflects a green color light G from among a red color light R, a green color light G, and a blue color light B, and allows the red color light R and the blue color light B to pass. By regulating a high refractive index material (hereinafter, called as "H"), a low refractive index material (hereinafter, called as "L"), and a ratio of an optical film thickness thereof respectively, an angle dependence with respect to a S polarization is reduced.

Moreover, a structure proposed as another optical device is a dichroic filter having 45 degree angle of incidence of an edge filter type which divides a wavelength band into two. The dichroic filter regulates the refractive index "H", the refractive index "L", which form a multilayer film, and the ratio of the optical film thickness thereof respectively. Accordingly, the angular dependence with respect to the S polarized light is reduced. Furthermore, a ripple of a short-wavelength passing region with respect to S polarization is reduced.

SUMMARY OF THE INVENTION

According to the present invention, it is possible to provide an optical device including a first optical member and a second optical member formed of a medium having a refractive index greater than 1, and a multiple layer film section which is provided between an optical surface of the first optical member and an optical surface of the second optical member.

The multiple layer film section has a structure in which, at least two types of thin film layers namely a first thin film layer, and a second thin film layer which has a refractive index higher than a refractive index of the first thin film layer, are stacked alternately. The first optical member and the second optical member are joined by an adhering means.

Where a refractive index of the first optical member and the second optical member is let to be nS, the refractive index of the first thin film layer is let to be nL, the refractive index of the second thin film layer is let to be nH, and an angle between a normal of a plane of the multiple layer film section and a light beam which is incident is let to be θ respectively, then the following conditional expression is satisfied.

$$1 \neq \frac{\sqrt{\frac{n_L^2 \times n_H^2}{(n_L^2 + n_H^2)\sin^2\theta}}}{n_S} \tag{1}$$

At the multiple layer film section, out of the light incident, a light of a first wavelength band is allowed to be reflected, and a light of a second wavelength band which is shorter than the first wavelength band, and a light of a third wavelength band which is longer than the first wavelength band are allowed to pass.

Moreover, according to a preferable aspect of the present invention, it is desirable that the multiple layer film section is formed of at least ten thin film layers, and from among all the thin film layers, at least 50% of the layers include one of the first thin film layer and the second thin film layer.

Furthermore, according to still another preferable aspect of the present invention, it is desirable that the following conditional expression (2) is further satisfied.

$$1.28 \leq \frac{\sqrt{\frac{n_L^2 \times n_H^2}{(n_L^2 + n_H^2)\sin^2\theta}}}{n_S} \tag{2}$$

According to still another preferable aspect of the present invention, it is desirable that the multiple layer film section is formed of at least ten layers, and there exists an i which satisfies the following conditional expression (3), within four layers from an outermost layer from both ends.

$$\frac{2k+1}{4} < \sum_{i=1}^{f} \frac{d_i \times n_R}{\lambda_R} \cos\varphi_R < \frac{2k+2}{4} \tag{3}$$

and $$\frac{2k}{4} < \sum_{i=1}^{f} \frac{d_i \times n_B}{\lambda_B} \cos\varphi_B < \frac{2k+1}{4}$$

where, an arbitrary wavelength in a continuous band equivalent to at least 50% of a wavelength conversion, in the third wavelength band is let to be $\lambda_R$, an arbitrary wavelength in a continuous band equivalent to at least 50% of a wavelength conversion, in the second wavelength band is let to be $\lambda_B$, a refractive index for the wavelength λR of an outermost layer of the multiple layer film section is let to be $n_R$, a refractive index for the wavelength λB of the outermost layer of the multiple layer film section is let to be $n_B$, a refractive index of the medium is let to be $n_M$, an angle of incidence on the multiple layer film section is let to be θ, the number of layers of the multiple layer film section is let to be i, a film thickness of an ith layer of the multiple layer film section is let to be $d_i$, k is an integral number not less than 1, and further $\phi_R$ and $\phi_B$ are defined as $$\varphi_R = \frac{n_M}{n_R}\sin\theta$$

$$\varphi_B = \frac{n_M}{n_B}\sin\theta$$

respectively.

Moreover, according to still another preferable aspect of the present invention, it is desirable that the multiple layer film section is formed by at least 10 layers, and within four layers from the outermost layer on both sides, there exists an interface of layers at which, an average value of an imaginary part of each optical admittance with a P polarization and an S polarization, in a continuous band equivalent to at least 50% of a wavelength conversion, in the third wavelength band becomes plus, and the average value of the imaginary part of each optical admittance with P polarization and the S polarization, in a continuous band equivalent to at least 50% of a wavelength conversion, in the second wavelength band becomes minus.

According to still another preferable aspect of the present invention, it is desirable that an angle of incidence on the multiple layer film section is used in a range of 40 degrees to 50 degrees.

According to still another preferable aspect of the present invention, it is desirable that a material which is selected from among $TiO_2$, $Ta_2O_5$, $ZrO_2$, $Hf_2$, $CeO_2$, $Y_2O_3$, $La_2O_3$, $AlO_3$, $LaTiO_3$, $La_{2X}Al_{2Y}O_{3(X+Y)}$, $SiO_2$, $MgF_2$ is used.

According to still another preferable aspect of the present invention, it is desirable that in the first wavelength band, a ratio P/S of an integral value s of an amount of reflected light of S polarization and an integral value p of an amount of reflected light of P polarization is not less than 0.4.

Moreover, according to the present invention, it is possible to provide a two-plate unit including the abovementioned optical device.

Furthermore, according to the present invention, it is possible to provide an imaging instrument which performs imaging of one of a moving picture, a still picture, and both the moving picture and the still picture, in which the abovementioned optical device is used.

According to the present invention, it is possible to provide an endoscope which includes the abovementioned optical device.

DETAILED DESCRIPTION OF THE INVENTION

Figure 1:
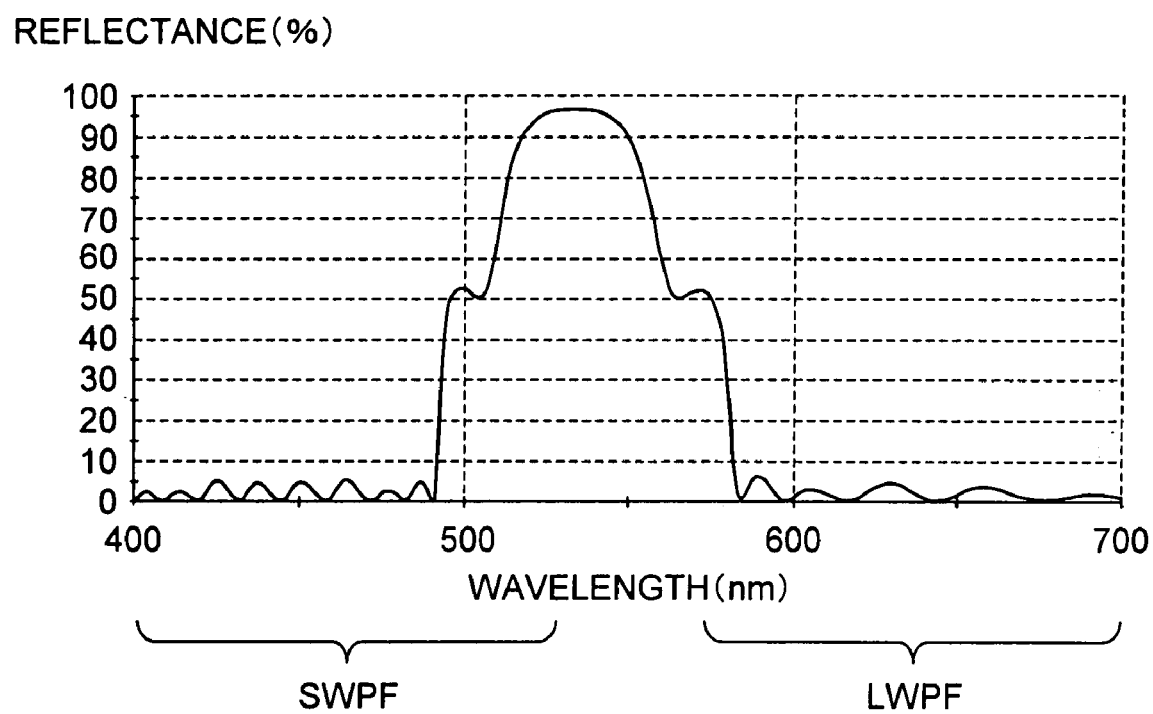
FIG. 1 is a diagram showing reflectance characteristics of a notch filter.

Exemplary embodiments of an optical device, a two-plate unit, an imaging instrument, and an endoscope equipped with this optical device is used according to the present invention, will be described below in detail with reference to the accompanying diagrams. However, the present invention is not restricted by the embodiments described below.

First of all, a means for reducing a difference in characteristics for an S polarization and a P polarization in the present invention will be described below. Inventors of the present application discovered that for reducing the difference in the characteristics of the S polarization and the P polarization in a 45 degree prism, a relationship of refractive indices of a base material, H, and L respectively, is important.

Where a refractive index of the base material is let to be $n_S$, a refractive index of H is let to be $n_H$, and a refractive index of L is let to be $n_L$, then by satisfying one of the following conditional expressions (2) and (4), it is possible to reduce the difference between the characteristics of the S polarization and the P polarization.

$$1.28 \leq \frac{\sqrt{\frac{n_L^2 \times n_H^2}{(n_L^2 + n_H^2)\sin^2\theta}}}{n_S} \quad (2)$$

$$0.85 \geq \frac{\sqrt{\frac{n_L^2 \times n_H^2}{(n_L^2 + n_H^2)\sin^2\theta}}}{n_S} \quad (4)$$

Moreover, when a conditional expression which is well known as Mc Neil condition shown in the following expression (5) is satisfied, the S polarization and the P polarization are completely diverged. In the present invention, it is desirable to recede as much as possible from this Mc Neil condition.

$$1 = \frac{\sqrt{\frac{n_L^2 \times n_H^2}{(n_L^2 + n_H^2)\sin^2\theta}}}{n_S} \quad (5)$$

With a realistic material, for the above-mentioned expressions (2) and (4) to hold good, it is favorable that a refractive index of a basic material is not more than 1.6. More preferably, it is desirable to let an upper limit value of expression (2) to be 1.75. More preferably, it is desirable to let a lower limit value of expression (4) to be 0.6.

Next, in the present invention, a means for reducing a ripple will be described. A case of a notch filter which allows a red color light R and a blue color light B to pass, and a green color light G to be reflected.

In this case, it is necessary that a red color light R side provides characteristics as a long wavelength pass filter (hereinafter, appropriately called as "LWPF"). At the same time, it is necessary that a blue color light B side provides characteristics as a short wavelength pass filter (hereinafter, appropriately called as "SWPF").

FIG. 1 shows characteristics of a reflectance of such notch filter. A horizontal axis is a wavelength (nm), and a vertical axis is a reflectance (%). Hereinafter, similar coordinates will be used in all diagram showing characteristics of the reflectance.

Figure 2:
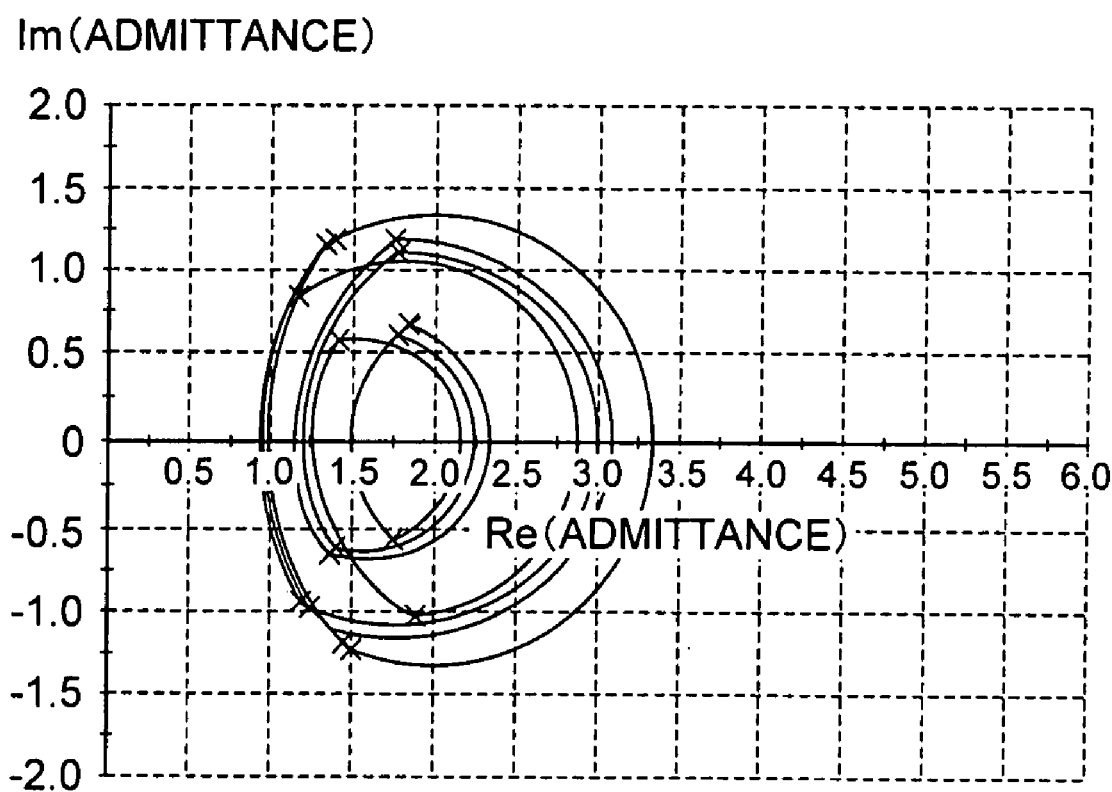
FIG. 2 is a diagram showing an admittance of a multiple layer film section of the notch filter.
Figure 3:
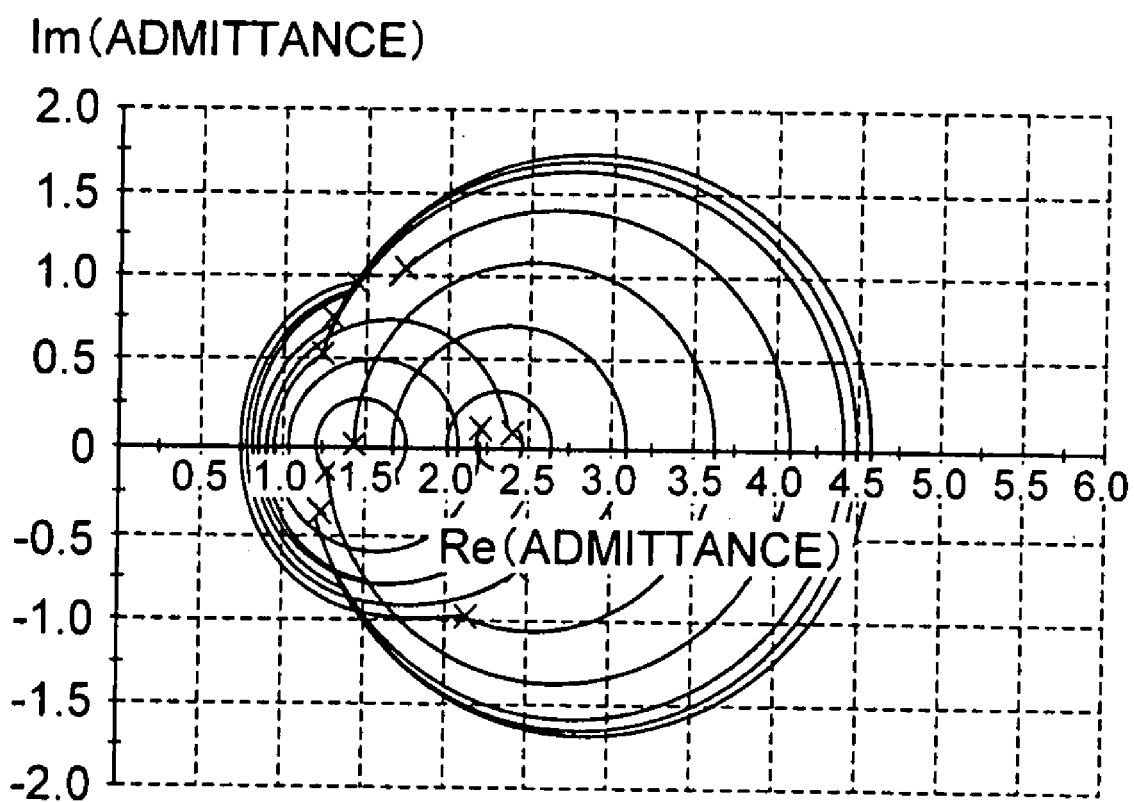
FIG. 3 is another diagram showing the admittance of the multiple layer film section of the notch filter.

Moreover, at the time of realizing each of the LWPF and the SWPF, it is necessary to let a multiple layer film section to have an admittance locus as shown in FIG. 2 and FIG. 3. In FIG. 2 and FIG. 3, a horizontal axis indicates a real part of an optical admittance, and a vertical axis indicates an imaginary part of the optical admittance. Hereinafter, similar coordinates will be used in all diagrams showing the optical admittance. Moreover, details of the optical admittance will be described later.

Here, in a case of the notch filter which allows the red color light R and the blue color light B to pass, and the green color light G to be reflected, in a band of the red color light R, it is necessary to have an admittance locus as in FIG. 2. Moreover, in a band of the blue color light B, it is necessary to have an admittance locus as in FIG. 3.

Inventors of the present application discovered that for realizing such admittance locus, it is necessary to form an adjustment layer having suitable characteristics, at both ends of a stack of a multiple layer film which forms a reflectance band of the green color light.

In a case of the LWPF, a basic structure of 0.5 H (LHLHL ... HLHLHL) 0.5 H, and in a case of the SWPF, a basic structure of 0.5 L (HLHLH ... LHLHLH) 0.5 L has been known in general. Here, alphabets in brackets show stacks forming the reflectance band, and 0.5 H or 0.5 L at both ends are adjustment layers.

In the case of the LWPF, a structure is such that due to the adjustment layer of 0.5 H, the stack which forms the reflectance band starts from a region where the imaginary part of the admittance becomes plus.

Whereas, in the case of the SWPF, a structure is such that, due to the adjustment layer of 0.5 L, the stack which forms the reflectance band starts from a region where the imaginary part of the admittance becomes minus.

In a case of the notch filter which allows the red color light R and the blue color light B to pass, and the green color light G to be reflected, for both the S polarization and the P polarization, in a band of the red color light R, a stack of the multiple layer films which forms a reflectance band of the green color light G starts from a region where the imaginary part of the admittance becomes plus, and in a band of the blue color light B, a stack of the multiple layer films which forms a reflectance band of the green color light G starts from a region where the imaginary part of the admittance becomes minus.

An arbitrary wavelength in a red color light R band is let to be $\lambda_R$,
an arbitrary wavelength in a blue color light B band is let to be $\lambda_B$,
a refractive index for the wavelength $\lambda_R$ of the adjustment layer at both ends of the multiple layer film stack is let to be $n_R$,
a refractive index for the wavelength $\lambda_B$ of the adjustment layer at both ends of the multiple layer film stack is let to be $n_B$,
a refractive index of the medium is let to be $n_M$,
an angle of incidence on the multiple layer film surface is let to be $\theta$, and
k is let to be an integral number not less than 1.

$$\varphi_R = \frac{n_M}{n_R}\sin\theta$$

$$\varphi_B = \frac{n_M}{n_B}\sin\theta$$

In this case, a thickness d of the adjustment layer is let to be a thickness which satisfies the following expression (6).

$$\frac{2k+1}{4} < \frac{d \times n_R}{\lambda_R}\cos\varphi_R < \frac{2k+2}{4} \quad (6)$$

and $$\frac{2k}{4} < \frac{d \times n_B}{\lambda_B}\cos\varphi_B < \frac{2k+1}{4}$$

Accordingly, it is possible to realize a filter in which the red color light R side provides the characteristics as the LWPF (long wavelength pass filter), and the blue color light B side provides the characteristics as the SWPF (short wavelength pass filter).

The adjustment layer need not be a single layer, and may be formed of a plurality of layers. When the adjustment layer is formed by the plurality of layers, there may be an i which satisfies expression (3).

$$\frac{2k+1}{4} < \sum_{i=1}^{f} \frac{d_i \times n_R}{\lambda_R}\cos\varphi_R < \frac{2k+2}{4} \quad (3)$$

and $$\frac{2k}{4} < \sum_{i=1}^{f} \frac{d_i \times n_B}{\lambda_B}\cos\varphi_B < \frac{2k+1}{4}$$

When the number of the adjustment layers becomes large, the reflection band is formed. Therefore, it is desirable that the number of the adjustment layers is not more than about four layers.

Furthermore, according to a refractive index of a material which forms a thin film layer, even when the abovementioned expression holds good, for the S polarization and the P polarization, in the band of the red color light R, the stack of the multiple layer film which forms the reflectance band of the green color light G, starts from the region where the imaginary part of the admittance becomes plus, in the band of the blue color light B, the stack of the multiple layer film which forms the reflectance band of the green color light G, starts from the region where the imaginary part of the admittance becomes minus.

In this case, returning to the principle, the film thickness of the adjustment layer may be set such that in the wavelength band of the red color light R, the imaginary part of the optical admittance becomes plus, and in the wavelength band of the blue color light B, the imaginary part of the optical admittance becomes minus.

An optical admittance Y is a numerical value calculated by the following expression (7).

$$Y = C/B \tag{7}$$

where $$\begin{bmatrix} B \\ C \end{bmatrix} = \left\{ \prod_{r=1}^{q} \begin{bmatrix} \cos\delta_r & (i\sin\delta_r)/\eta_r \\ i\eta_r\sin\delta_r & \cos\delta_r \end{bmatrix} \right\} \begin{bmatrix} 1 \\ \eta_m \end{bmatrix}$$

$$\delta_r = \frac{2\pi n_r d_r \cos\theta_r}{\lambda}$$

$\eta_r = n_r \cos\theta_r (S \text{ polarization})$ $\eta_r = n_r/\cos\theta_r (P \text{ polarization})$ $\eta_m = n_m \cos\theta_m (S \text{ polarization})$ $\eta_m = n_m/\cos\theta_m (P \text{ polarization})$ $n_r \sin\theta_r = n_m \sin\theta_m$ where
q denotes the number of layers, which calculates the optical admittance,
r denotes a layer number of a layer which calculates the optical admittance,
$n_r$ denotes a refractive index of a film material,
$n_m$ denotes a refractive index of an optical member,
$\theta_r$ denotes an angle of incidence of a light beam through the film after refraction,
$\theta_m$ denotes an angle of a light beam incident on a film surface from the optical member,
$d_r$ denotes a thickness of the film,
$\lambda$ denotes a wavelength which calculates (makes calculate) the optical admittance, and
Y denotes the optical admittance.

First Embodiment

Figure 4:
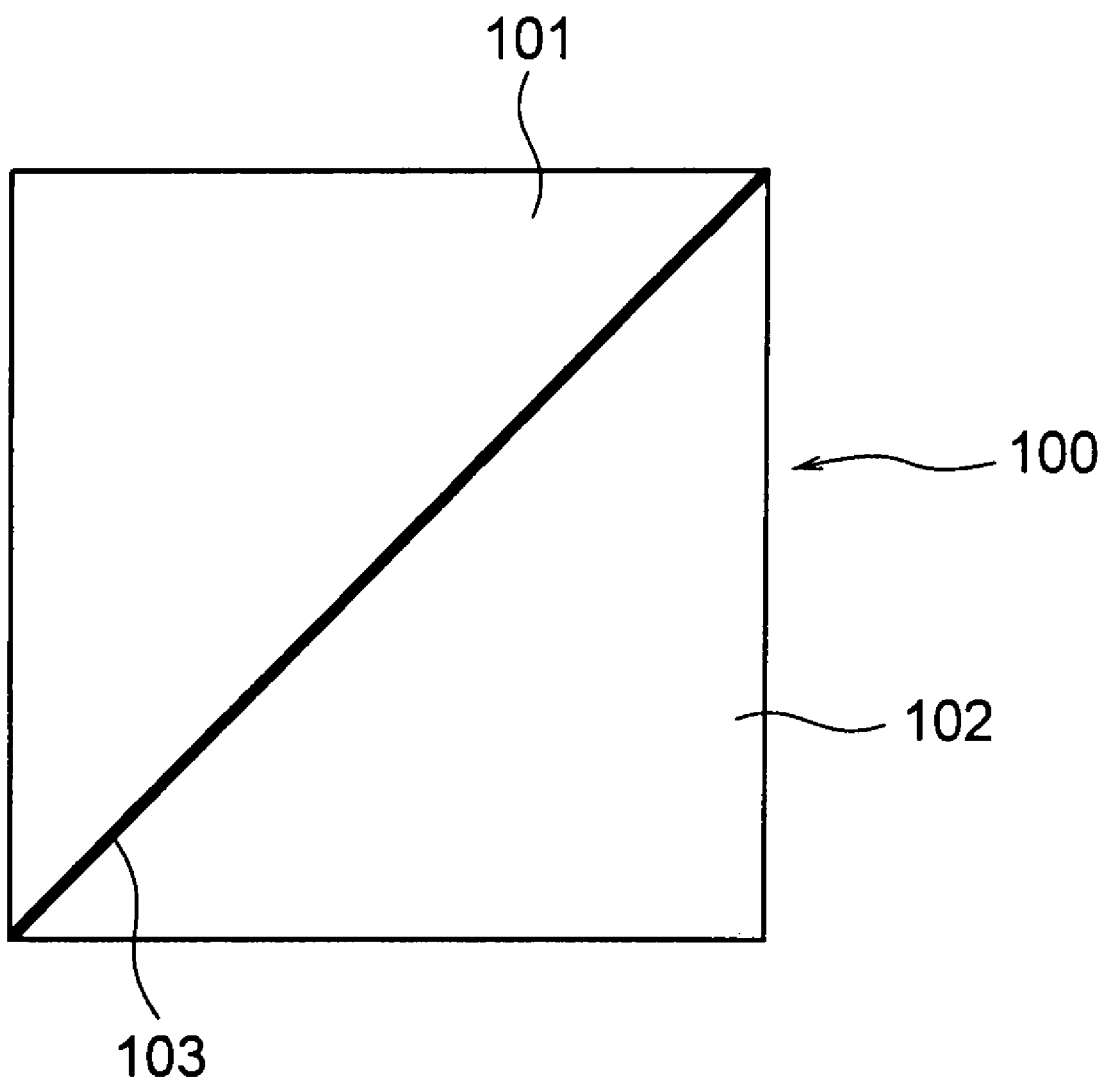
FIG. 4 is a diagram showing a schematic structure of optical components of a first embodiment.

Next, an optical component 100 according to a first embodiment of the present invention will be described below. FIG. 4 shows a schematic structure of the optical component 100 in which two optical members 101 and 102 are glued together, and a multiple layer film section 103 is inserted into the interfaces of the optical members 101 and 102. Here, an optical glass (such as BK7) having the refractive index 1.521 is used for both the optical members 101 and 102.

As a material of a first thin film layer which forms the multiple layer film section 103, $Y_2O_3$ having n=1.822 is used. Moreover, as a material of a second thin film layer which forms the multiple layer film section 103, $Ta_2O_5$ having n=2.200 is used.

Next, a manufacturing procedure of the optical component 100 will be described below. First of all, the multiple layer film section 103 which will be described later is formed on the optical member 101 by a method such as a vacuum deposition and a sputtering. A surface of the optical member 101 on which the multiple layer film section 103 is formed, and a corresponding surface of the optical member 102 are adhered by an adhesive such as a UV curing adhesive or a thermosetting adhesive.

An optical adhesive which is available in the market, having a refractive index n of about 1.514 is to be used. An angle of incidence on the multiple layer film section 103 is 45 degrees. A structure of the multiple layer film section 103 is shown in table 1 below.

TABLE 1

| Layer | Material | Refractive index | Film thickness (nm) |
|---|---|---|---|
| Optical member 1 | BK7 | 1.521 | — |
| 1 | $Ta_2O_5$ | 2.200 | 68.19 |
| 2 | $Y_2O_3$ | 1.822 | 68.37 |
| 3 | $Ta_2O_5$ | 2.200 | 67.18 |
| 4 | $Y_2O_3$ | 1.822 | 135.58 |
| 5 | $Ta_2O_5$ | 2.200 | 56.09 |
| 6 | $Y_2O_3$ | 1.822 | 58.21 |
| 7 | $Ta_2O_5$ | 2.200 | 79.31 |
| 8 | $Y_2O_3$ | 1.822 | 103.74 |
| 9 | $Ta_2O_5$ | 2.200 | 72.58 |
| 10 | $Y_2O_3$ | 1.822 | 82.11 |
| 11 | $Ta_2O_5$ | 2.200 | 65.71 |
| 12 | $Y_2O_3$ | 1.822 | 97.88 |
| 13 | $Ta_2O_5$ | 2.200 | 72.62 |
| 14 | $Y_2O_3$ | 1.822 | 87.70 |
| 15 | $Ta_2O_5$ | 2.200 | 67.38 |
| 16 | $Y_2O_3$ | 1.822 | 91.57 |
| 17 | $Ta_2O_5$ | 2.200 | 70.89 |
| 18 | $Y_2O_3$ | 1.822 | 94.27 |
| 19 | $Ta_2O_5$ | 2.200 | 68.40 |
| 20 | $Y_2O_3$ | 1.822 | 89.06 |
| 21 | $Ta_2O_5$ | 2.200 | 68.21 |
| 22 | $Y_2O_3$ | 1.822 | 93.78 |
| 23 | $Ta_2O_5$ | 2.200 | 71.41 |
| 24 | $Y_2O_3$ | 1.822 | 91.67 |
| 25 | $Ta_2O_5$ | 2.200 | 67.20 |
| 26 | $Y_2O_3$ | 1.822 | 87.68 |
| 27 | $Ta_2O_5$ | 2.200 | 72.12 |
| 28 | $Y_2O_3$ | 1.822 | 99.21 |
| 29 | $Ta_2O_5$ | 2.200 | 64.87 |
| 30 | $Y_2O_3$ | 1.822 | 84.04 |
| 31 | $Ta_2O_5$ | 2.200 | 69.19 |
| 32 | $Y_2O_3$ | 1.822 | 109.85 |
| 33 | $Ta_2O_5$ | 2.200 | 75.66 |
| 34 | $Y_2O_3$ | 1.822 | 57.39 |
| 35 | $Ta_2O_5$ | 2.200 | 59.21 |
| 36 | $Y_2O_3$ | 1.822 | 136.14 |
| 37 | $Ta_2O_5$ | 2.200 | 63.75 |
| 38 | $Y_2O_3$ | 1.822 | 70.65 |
| 39 | $Ta_2O_5$ | 2.200 | 68.19 |
| Adhesive | Available in market | 1.514 | — |
| Optical member 2 | BK7 | 1.521 | — |

Moreover, the following expression (8) holds good in this case.

$$\frac{\sqrt{\frac{n_L^2 \times n_H^2}{(n_L^2 + n_H^2)\sin^2\theta}}}{n_S} = 1.304656 \tag{8}$$

Therefore, expression (1) mentioned above is satisfied.

$$1 \neq \frac{\sqrt{\frac{n_L^2 \times n_H^2}{(n_L^2 + n_H^2)\sin^2\theta}}}{n_S} \quad (1)$$

As the abovementioned expression (1) is satisfied, in the first embodiment, an effect that it is possible to achieve an optical device with a small separation of the P polarization and the S polarization, is shown.

Moreover, in the first embodiment, since the expression (8) is satisfied, the expression (2) is clearly satisfied. Accordingly, furthermore an effect that it is possible to achieve an optical device with a small separation of the P polarization and the S polarization, is shown.

$$1.28 \leq \frac{\sqrt{\frac{n_L^2 \times n_H^2}{(n_L^2 + n_H^2)\sin^2\theta}}}{n_S} \quad (2)$$

Figure 5:
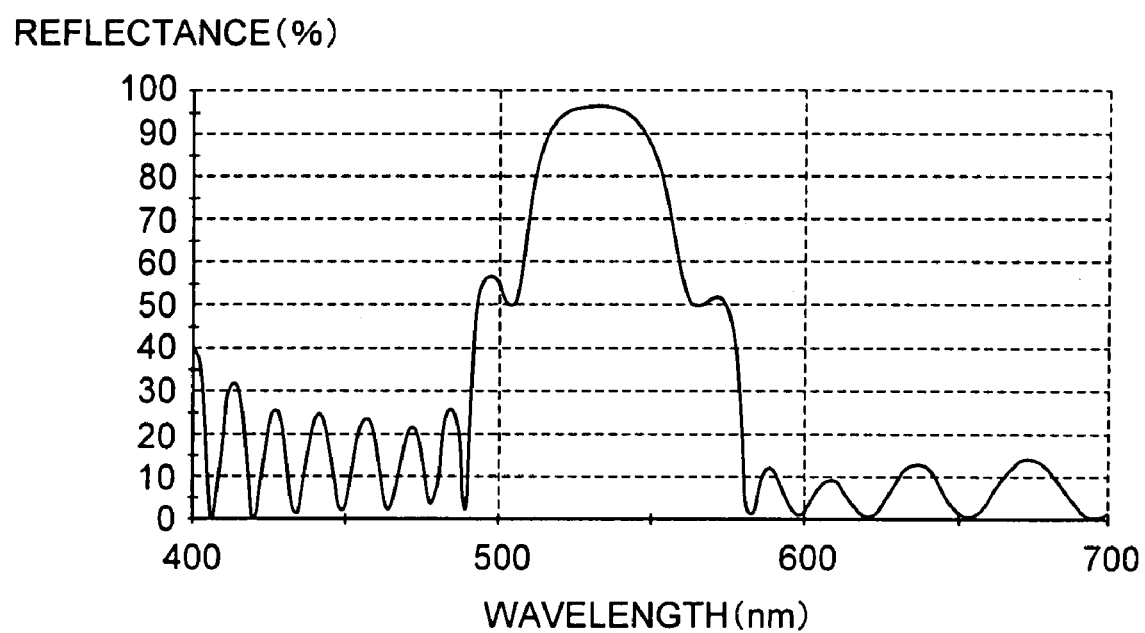
FIG. 5 is a diagram showing reflectance characteristics in the first embodiment.

Moreover, FIG. 5 shows characteristics of a reflectance for a random polarization of the optical component 100 which is structured as mentioned above. It has characteristics of allowing a light of a first wavelength band (Green) to be reflected, and allowing a light of a second wavelength band (Blue) which is shorter than the first wavelength band, and a light of a third wavelength band (Red) which is longer than the first wavelength band to pass.

In the first embodiment, an optical member and a film material are not restricted, and can be made of any material. Furthermore, for ensuring favorable characteristics, it is desirable that a refractive index of an adhesive of the optical member is not more than 1.6 (n≦1.6), and a refractive index of the film material is not less than 1.75. (n≧1.75). Moreover, it is desirable that the refractive index of the optical member and the adhesive are values mutually as close as possible.

Second Embodiment

Next, an optical component according to a second embodiment of the present invention will be described below. The second embodiment differs from the first embodiment at points that the material of the optical member is changed to fused quartz glass, and further, a $SiO_2$ layer is formed as a protective layer at both ends of the multiple layer film section.

In the second embodiment, an optical glass (fused quartz) having a refractive index n=1.470 is used for both the optical members 101 and 102.

As a material of a first thin film layer which forms the multiple layer film section 103, $Y_2O_3$ having n=1.822 is used. Moreover, as a material of a second thin film layer which forms the multiple layer film section 103, $Ta_2O_5$ having n=2.200 is used.

An angle of incidence on the multiple layer film section 103 is 45 degrees. Moreover, as a third thin film layer forming the multiple layer film section 103, $SiO_2$ having n=1.461 is used. Furthermore, out of the total of 41 layers, 39 layers which form more than 50%, are formed of one of the material of the first thin film layer and the material of the second thin film layer.

A structure of the multiple layer film section 103 is shown in table 2 below.

TABLE 2

| Layer | Material | Refractive index | Film thickness (nm) |
|---|---|---|---|
| Material | Quartz | 1.470 | — |
| 1 | $SiO_2$ | 1.461 | 171.00 |
| 2 | $Ta_2O_5$ | 2.200 | 68.19 |
| 3 | $Y_2O_3$ | 1.822 | 68.37 |
| 4 | $Ta_2O_5$ | 2.200 | 67.18 |
| 5 | $Y_2O_3$ | 1.822 | 135.58 |
| 6 | $Ta_2O_5$ | 2.200 | 56.09 |
| 7 | $Y_2O_3$ | 1.822 | 58.21 |
| 8 | $Ta_2O_5$ | 2.200 | 79.31 |
| 9 | $Y_2O_3$ | 1.822 | 103.74 |
| 10 | $Ta_2O_5$ | 2.200 | 72.58 |
| 11 | $Y_2O_3$ | 1.822 | 82.11 |
| 12 | $Ta_2O_5$ | 2.200 | 65.71 |
| 13 | $Y_2O_3$ | 1.822 | 97.88 |
| 14 | $Ta_2O_5$ | 2.200 | 72.62 |
| 15 | $Y_2O_3$ | 1.822 | 87.70 |
| 16 | $Ta_2O_5$ | 2.200 | 67.38 |
| 17 | $Y_2O_3$ | 1.822 | 91.57 |
| 18 | $Ta_2O_5$ | 2.200 | 70.89 |
| 19 | $Y_2O_3$ | 1.822 | 94.27 |
| 20 | $Ta_2O_5$ | 2.200 | 68.40 |
| 21 | $Y_2O_3$ | 1.822 | 89.06 |
| 22 | $Ta_2O_5$ | 2.200 | 68.21 |
| 23 | $Y_2O_3$ | 1.822 | 93.78 |
| 24 | $Ta_2O_5$ | 2.200 | 71.41 |
| 25 | $Y_2O_3$ | 1.822 | 91.67 |
| 26 | $Ta_2O_5$ | 2.200 | 67.20 |
| 27 | $Y_2O_3$ | 1.822 | 87.68 |
| 28 | $Ta_2O_5$ | 2.200 | 72.12 |
| 29 | $Y_2O_3$ | 1.822 | 99.21 |
| 30 | $Ta_2O_5$ | 2.200 | 64.87 |
| 31 | $Y_2O_3$ | 1.822 | 84.04 |
| 32 | $Ta_2O_5$ | 2.200 | 69.19 |
| 33 | $Y_2O_3$ | 1.822 | 109.85 |
| 34 | $Ta_2O_5$ | 2.200 | 75.66 |
| 35 | $Y_2O_3$ | 1.822 | 57.39 |
| 36 | $Ta_2O_5$ | 2.200 | 59.21 |
| 37 | $Y_2O_3$ | 1.822 | 136.14 |
| 38 | $Ta_2O_5$ | 2.200 | 63.75 |
| 39 | $Y_2O_3$ | 1.822 | 70.65 |
| 40 | $Ta_2O_5$ | 2.200 | 68.19 |
| 41 | $SiO_2$ | 1.461 | 171.00 |
| Adhesive | Available in market | 1.477 | — |
| Substrate | Quartz | 1.470 | — |

Figure 6:
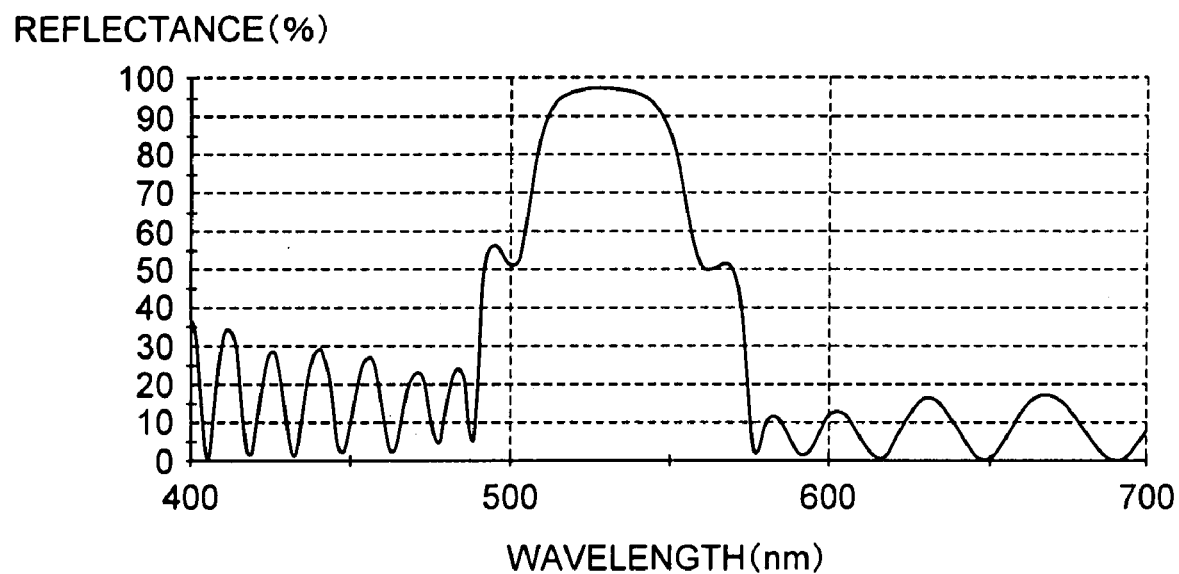
FIG. 6 is a diagram showing the reflectance characteristics in a second embodiment.

FIG. 6 shows characteristics of reflectance for the random polarization of the optical device having this structure. It has characteristics of allowing the light of the first wavelength band (Green) to be reflected, and allowing the light of the second wavelength band (Blue) which is shorter than the first wavelength band, and the light of the third wavelength band (Red) which is longer than the first wavelength band to pass.

In the second embodiment, the multiple layer film section 103 is formed by at least ten thin film layers, and at least 50% of the total layers include one of the first thin film layer and the second thin film layer. Accordingly, it is possible to manufacture a filter with a small separation of the P polarization and the S polarization. Moreover, an effect that it is possible to improve protection from the environment by forming a layer such as a protective layer is shown.

Third Embodiment

Next, an optical component according to a third embodiment of the present invention will be described below. In the third embodiment, the optical glass (such as BK7) having the refractive index 1.521 is used for both the optical members 101 and 102. As a material of the first thin film layer which forms the multiple layer film section 103, $Y_2O_3$ having n=1.822 is used. As a material of the second thin film layer which forms the multiple layer section 103, $Ta_2O_5$ having n=2.200 is used.

The angle of incidence on the multiple layer film section 103 is 45 degrees. A structure of the multiple layer film section 103 is shown in table 3.

TABLE 3

| Layer | Material | Refractive index | Film thickness (nm) |
|---|---|---|---|
| Medium | BK7 | 1.521 | — |
| 1 | $Ta_2O_5$ | 2.200 | 216.38 |
| 2 | $Y_2O_3$ | 1.822 | 47.01 |
| 3 | $Ta_2O_5$ | 2.200 | 105.27 |
| 4 | $Y_2O_3$ | 1.822 | 62.38 |
| 5 | $Ta_2O_5$ | 2.200 | 100.99 |
| 6 | $Y_2O_3$ | 1.822 | 41.56 |
| 7 | $Ta_2O_5$ | 2.200 | 94.59 |
| 8 | $Y_2O_3$ | 1.822 | 54.97 |
| 9 | $Ta_2O_5$ | 2.200 | 92.59 |
| 10 | $Y_2O_3$ | 1.822 | 73.01 |
| 11 | $Ta_2O_5$ | 2.200 | 85.00 |
| 12 | $Y_2O_3$ | 1.822 | 69.47 |
| 13 | $Ta_2O_5$ | 2.200 | 84.69 |
| 14 | $Y_2O_3$ | 1.822 | 64.29 |
| 15 | $Ta_2O_5$ | 2.200 | 88.97 |
| 16 | $Y_2O_3$ | 1.822 | 73.07 |
| 17 | $Ta_2O_5$ | 2.200 | 78.09 |
| 18 | $Y_2O_3$ | 1.822 | 77.29 |
| 19 | $Ta_2O_5$ | 2.200 | 82.98 |
| 20 | $Y_2O_3$ | 1.822 | 75.47 |
| 21 | $Ta_2O_5$ | 2.200 | 81.94 |
| 22 | $Y_2O_3$ | 1.822 | 66.60 |
| 23 | $Ta_2O_5$ | 2.200 | 84.43 |
| 24 | $Y_2O_3$ | 1.822 | 73.90 |
| 25 | $Ta_2O_5$ | 2.200 | 84.94 |
| 26 | $Y_2O_3$ | 1.822 | 73.86 |
| 27 | $Ta_2O_5$ | 2.200 | 79.38 |
| 28 | $Y_2O_3$ | 1.822 | 67.84 |
| 29 | $Ta_2O_5$ | 2.200 | 97.80 |
| 30 | $Y_2O_3$ | 1.822 | 58.71 |
| 31 | $Ta_2O_5$ | 2.200 | 81.11 |
| 32 | $Y_2O_3$ | 1.822 | 63.83 |
| 33 | $Ta_2O_5$ | 2.200 | 102.15 |
| 34 | $Y_2O_3$ | 1.822 | 59.42 |
| 35 | $Ta_2O_5$ | 2.200 | 88.39 |
| 36 | $Y_2O_3$ | 1.822 | 45.98 |
| 37 | $Ta_2O_5$ | 2.200 | 114.76 |
| 38 | $Y_2O_3$ | 1.822 | 29.49 |
| 39 | $Ta_2O_5$ | 2.200 | 101.24 |
| 40 | $Y_2O_3$ | 1.822 | 60.84 |
| 41 | $Ta_2O_5$ | 2.200 | 131.88 |
| 42 | $Y_2O_3$ | 1.822 | 60.83 |
| 43 | $Ta_2O_5$ | 2.200 | 17.01 |
| Adhesive | Available in market | 1.514 | — |
| Substrate | BK7 | 1.521 | — |

Here, a film thickness of the first layer is 216.38 nm. Moreover, the second wavelength band is let to be in a range of 400 nm to 488 nm. 50% of this band width is 44 nm. Furthermore, the third wavelength band is let to be in a range of 578 nm to 700 nm. 50% of this band width is 61 nm. The angle of incidence θ is 45 degrees.

Refractive index according to the wavelength, and a value of (in) the following expression (9) are shown in table 4.

TABLE 4

$$\frac{d \times n}{\lambda} \cos \varphi \quad (9)$$

| Wavelength (nm) | $Y_2O_3$ | $Ta_2O_5$ | $\frac{d \times n}{\lambda} \cos \varphi$ |
|---|---|---|---|
| 400 | 1.842 | 2.281 | 0.996 |
| 425 | 1.836 | 2.254 | 0.935 |
| 488 | 1.824 | 2.206 | 0.809 |
| 578 | 1.813 | 2.169 | 0.679 |
| 700 | 1.805 | 2.142 | 0.558 |

In the third embodiment, when i=1, the above-mentioned conditional expression (3) is satisfied. Accordingly, it is possible to manufacture a filter with a small separation of the P polarization and the S polarization. Moreover, an effect that it is possible to reduce a ripple of a pass band is shown.

A film thickness of a forty third layer is 17.01 nm. A film thickness of a forty second layer is 60.83 nm. A thickness of a forty first layer is 131.88 nm.

The refractive index according to the wavelength, and a value of (in) the following expression (10) are shown in table 5.

TABLE 5

$$\sum_{i=1}^{f} \frac{d_i \times n}{\lambda} \cos \varphi \quad (10)$$

| Wavelength (nm) | $Y_2O_3$ | $Ta_2O_5$ | 43 Layer i = 1 | 43~42 Layer i = 2 | 43-41 Layer i = 3 |
|---|---|---|---|---|---|
| 400 | 1.842 | 2.281 | 0.078 | 0.425 | 1.033 |
| 425 | 1.836 | 2.254 | 0.073 | 0.396 | 0.966 |
| 488 | 1.824 | 2.206 | 0.064 | 0.339 | 0.832 |
| 578 | 1.813 | 2.169 | 0.053 | 0.282 | 0.695 |
| 640 | 1.808 | 2.152 | 0.048 | 0.253 | 0.625 |
| 700 | 1.805 | 2.142 | 0.044 | 0.230 | 0.570 |

In the third embodiment, when i=2, or when i=3, the above-mentioned conditional expression (3) is satisfied.

Figure 7:
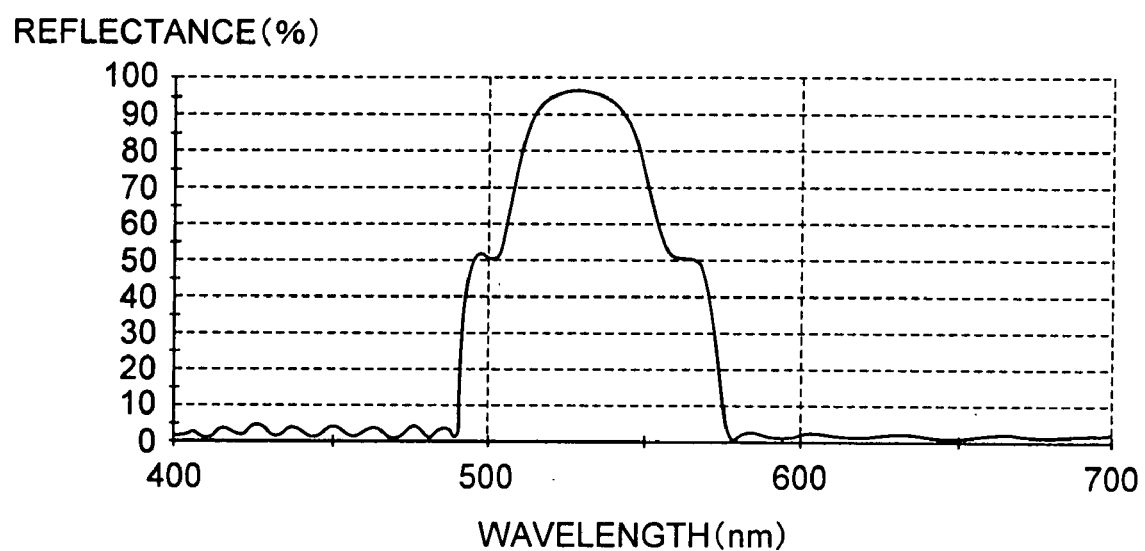
FIG. 7 is a diagram showing the reflectance characteristics in a third embodiment.

FIG. 7 shows characteristics of the reflectance in the third embodiment. As it is evident from FIG. 7, as the conditional expression (3) is satisfied, it can be seen that the ripple is reduced as it has been mentioned above.

Fourth Embodiment

Next, an optical component according to a fourth embodiment of the present invention will be described below. In table 6, design examples in the fourth embodiment are shown.

TABLE 6

| Layer | Material | Refractive index | Film thickness (nm) |
|---|---|---|---|
| Medium | Quartz | 1.470 | — |
| 1 | $SiO_2$ | 1.461 | 171.12 |
| 2 | $Ta_2O_5$ | 2.200 | 212.19 |
| 3 | $Y_2O_3$ | 1.822 | 66.93 |
| 4 | $Ta_2O_5$ | 2.200 | 65.97 |

TABLE 6-continued

| Layer | Material | Refractive index | Film thickness (nm) |
|---|---|---|---|
| 5 | $Y_2O_3$ | 1.822 | 134.73 |
| 6 | $Ta_2O_5$ | 2.200 | 53.77 |
| 7 | $Y_2O_3$ | 1.822 | 53.66 |
| 8 | $Ta_2O_5$ | 2.200 | 76.34 |
| 9 | $Y_2O_3$ | 1.822 | 105.48 |
| 10 | $Ta_2O_5$ | 2.200 | 72.84 |
| 11 | $Y_2O_3$ | 1.822 | 76.71 |
| 12 | $Ta_2O_5$ | 2.200 | 60.22 |
| 13 | $Y_2O_3$ | 1.822 | 99.10 |
| 14 | $Ta_2O_5$ | 2.200 | 73.80 |
| 15 | $Y_2O_3$ | 1.822 | 84.55 |
| 16 | $Ta_2O_5$ | 2.200 | 62.66 |
| 17 | $Y_2O_3$ | 1.822 | 89.69 |
| 18 | $Ta_2O_5$ | 2.200 | 70.94 |
| 19 | $Y_2O_3$ | 1.822 | 94.21 |
| 20 | $Ta_2O_5$ | 2.200 | 65.40 |
| 21 | $Y_2O_3$ | 1.822 | 85.45 |
| 22 | $Ta_2O_5$ | 2.200 | 65.09 |
| 23 | $Y_2O_3$ | 1.822 | 93.62 |
| 24 | $Ta_2O_5$ | 2.200 | 71.68 |
| 25 | $Y_2O_3$ | 1.822 | 89.84 |
| 26 | $Ta_2O_5$ | 2.200 | 62.26 |
| 27 | $Y_2O_3$ | 1.822 | 84.30 |
| 28 | $Ta_2O_5$ | 2.200 | 73.10 |
| 29 | $Y_2O_3$ | 1.822 | 100.91 |
| 30 | $Ta_2O_5$ | 2.200 | 59.49 |
| 31 | $Y_2O_3$ | 1.822 | 79.03 |
| 32 | $Ta_2O_5$ | 2.200 | 68.42 |
| 33 | $Y_2O_3$ | 1.822 | 112.27 |
| 34 | $Ta_2O_5$ | 2.200 | 72.80 |
| 35 | $Y_2O_3$ | 1.822 | 53.14 |
| 36 | $Ta_2O_5$ | 2.200 | 56.77 |
| 37 | $Y_2O_3$ | 1.822 | 135.08 |
| 38 | $Ta_2O_5$ | 2.200 | 62.97 |
| 39 | $Y_2O_3$ | 1.822 | 68.94 |
| 40 | $Ta_2O_5$ | 2.200 | 211.97 |
| 41 | $SiO_2$ | 1.461 | 171.12 |
| Adhesive | Available in market | 1.477 | |
| Substrate | Quartz | 1.470 | — |

Result of calculation according to the expression (10), for the forty first layer and the fortieth layer is shown in table 7.

TABLE 7

| Wavelength (nm) | Average value of PS at admittance imaginary part | | of an interface between 40th layer and 30th layer | $\sum_{i=1}^{f} \frac{d_i \times n}{\lambda} \cos \varphi$ | |
|---|---|---|---|---|---|
| | $Ta_2O_5$ | $SiO_2$ | | 41 Layer $i=1$ | 41~40 Layer $i=2$ |
| 400 | 2.281 | 1.470 | plus | 0.551 | 1.701 |
| 444 | 2.236 | 1.465 | minus | 0.495 | 1.508 |
| 488 | 2.206 | 1.462 | minus | 0.449 | 1.357 |
| 578 | 2.169 | 1.458 | plus | 0.378 | 1.129 |
| 640 | 2.153 | 1.457 | plus | 0.341 | 1.014 |
| 700 | 2.142 | 1.456 | plus | 0.311 | 0.923 |

In the fourth embodiment, the abovementioned conditional expression (3) is not satisfied. On the other hand, there exists an interface of layers for which, regarding an average value of PS of an optical admittance imaginary part of an interface between the fortieth layer and a thirty ninth layer, in the third wavelength band (Red: range of 578 nm to 700 nm), at least, in a continuous band corresponding to 50% of the wavelength conversion, the average value of each optical admittance imaginary part for the P polarization and the S polarization becomes plus, and in the second wavelength band (Blue: range of 400 nm to 488 nm), at least, in a continuous band corresponding to 50% of the wavelength conversion, the average value of each optical admittance for the P polarization and the S polarization becomes minus. Accordingly, it is possible to manufacture a filter with a small separation of the P polarization and the S polarization. Moreover, an effect that it is possible to reduce the ripple in the pass band is shown.

Figure 8:
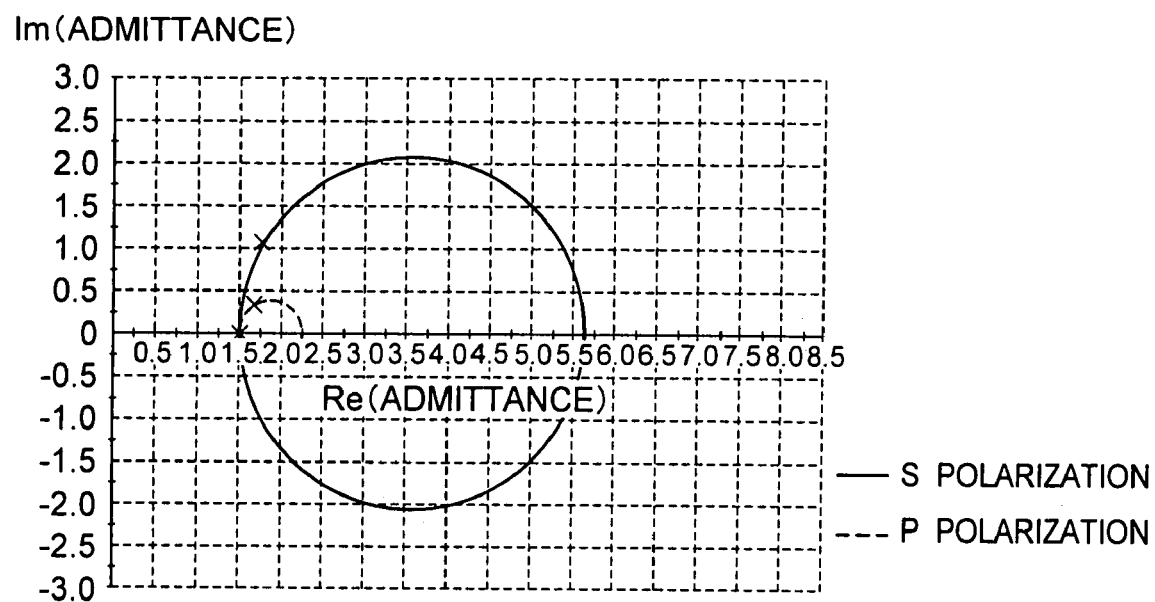
FIG. 8 is a diagram showing an admittance locus in a fourth embodiment.
Figure 9:
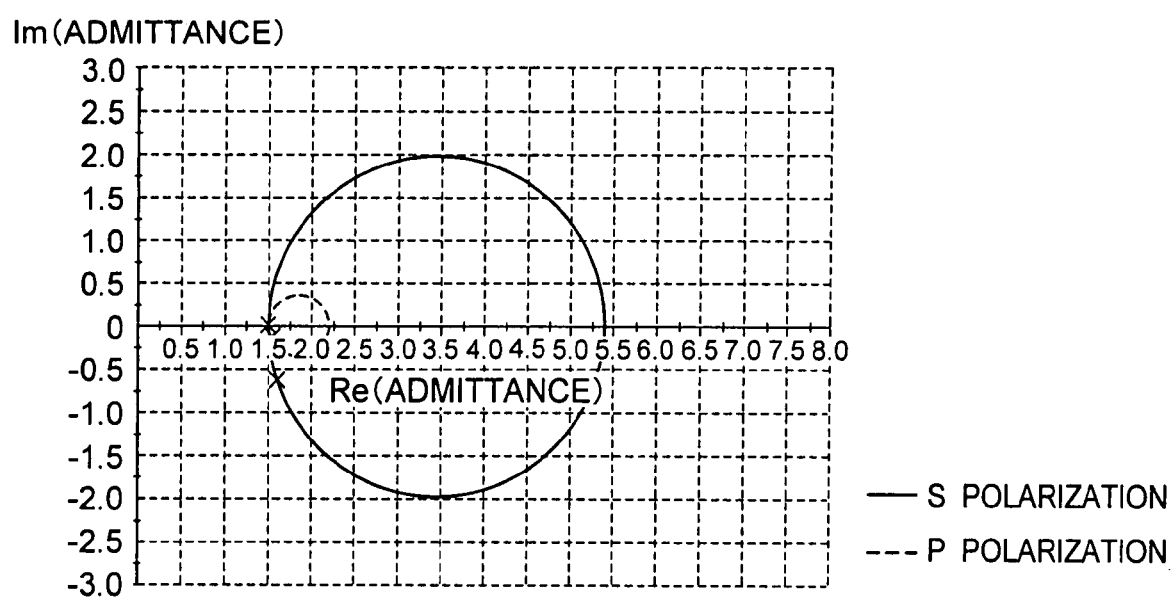
FIG. 9 is another diagram showing the admittance locus in the fourth embodiment.
Figure 10:
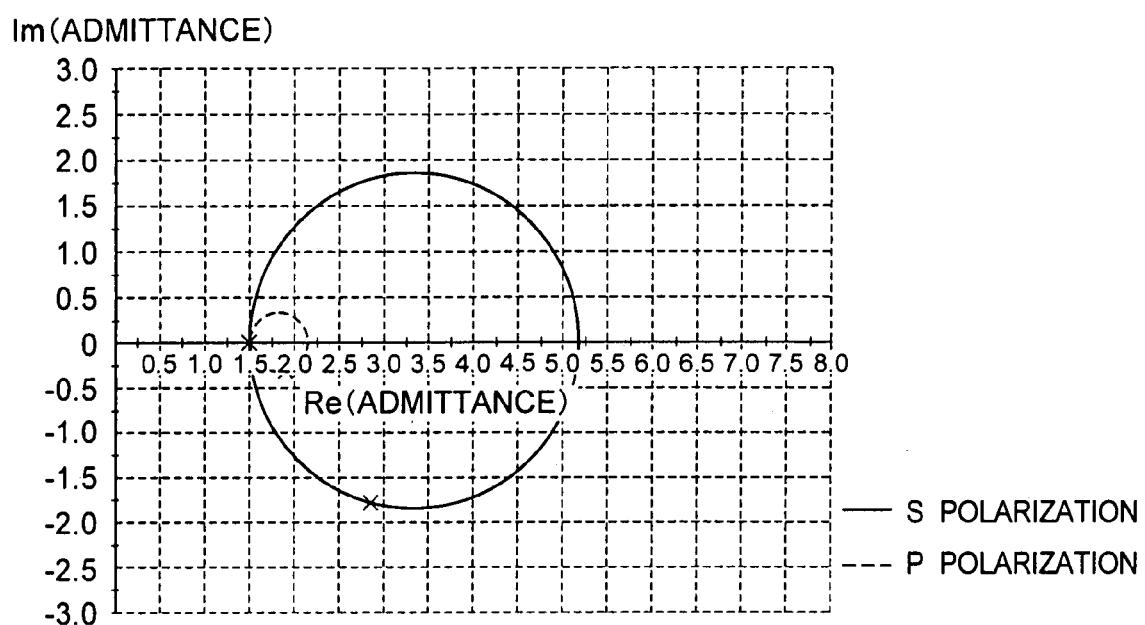
FIG. 10 is still another diagram showing the admittance locus in the fourth embodiment.
Figure 11:
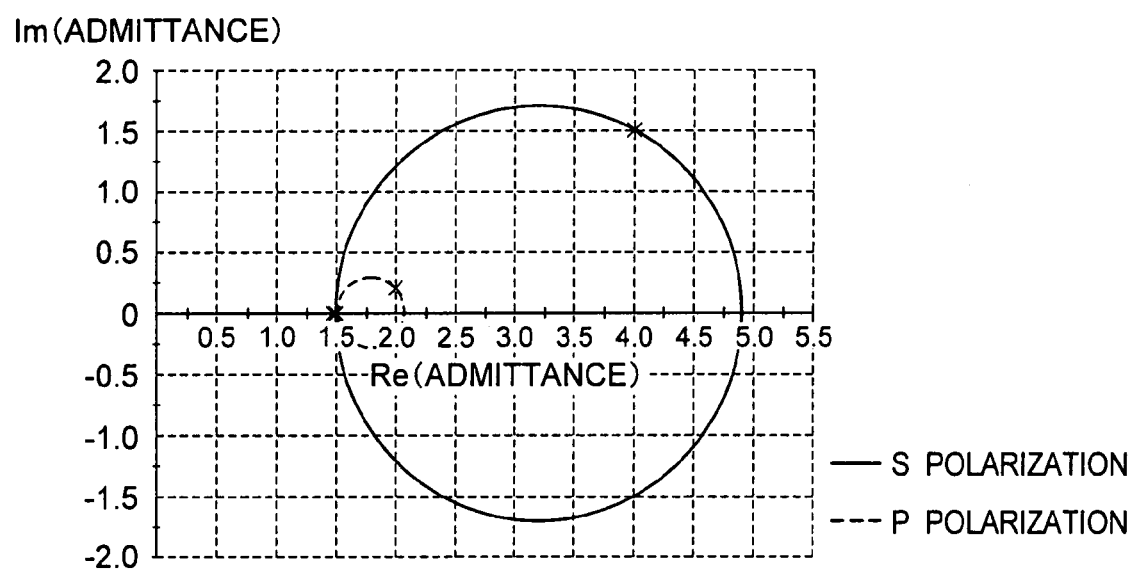
FIG. 11 is still another diagram showing the admittance locus in the fourth embodiment.
Figure 12:
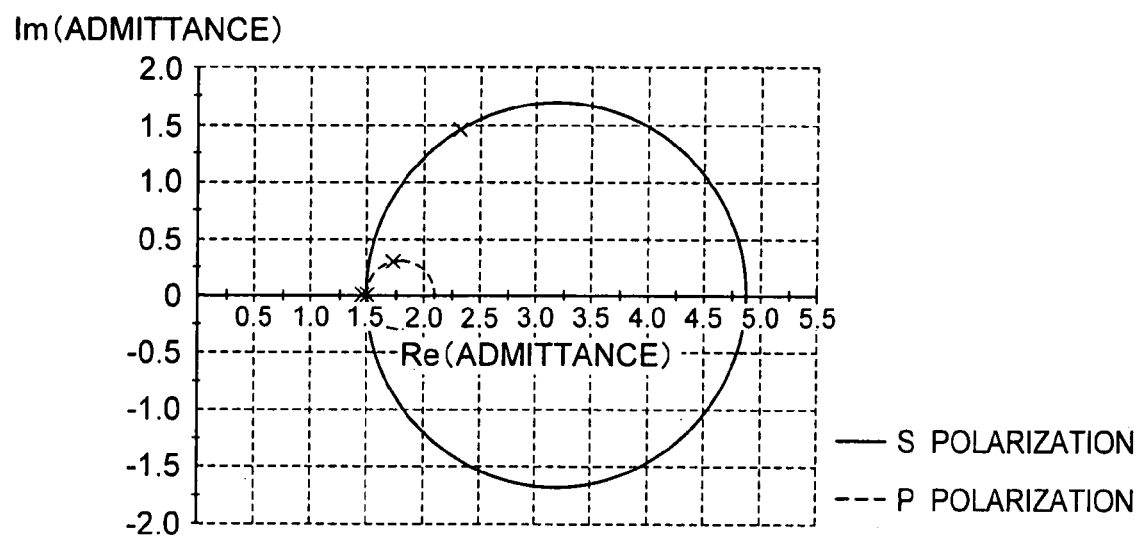
FIG. 12 is a still another diagram showing the admittance locus in the fourth embodiment.
Figure 13:
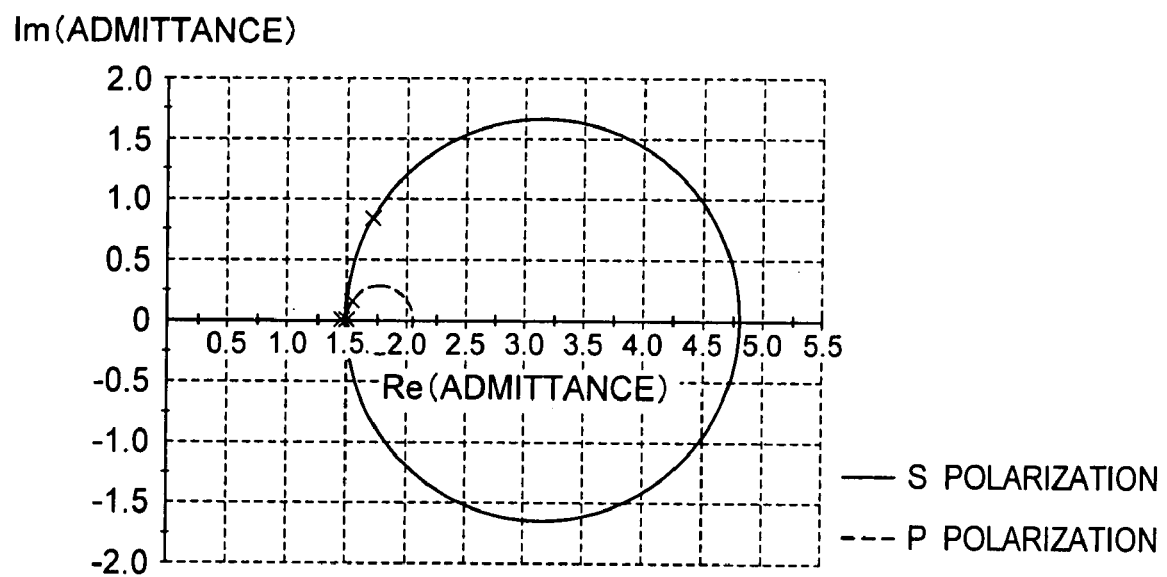
FIG. 13 is still another diagram showing the admittance locus in the fourth embodiment.

FIG. 8 to FIG. 13 show an optical admittance locus in the fourth embodiment. "X" shows an optical admittance value at the layer interface. FIG. 8 shows an admittance locus for the forty first layer to the fortieth layer, at 400 nm (an optical admittance attainment point of the fortieth layer, in other words, the imaginary part of the optical admittance at the interface of the fortieth layer and the thirty ninth layer is plus). FIG. 9 shows the admittance locus for the forty first layer to the fortieth layer, at 444 nm (the optical admittance attainment point of the fortieth layer, in other words, the imaginary part of the optical admittance at the interface of the fortieth layer and the thirty ninth layer is minus). FIG. 10 shows the admittance locus for the forty first layer to the fortieth layer, at 488 nm (the optical admittance attainment point of the fortieth layer, in other words, the imaginary part of the optical admittance at the interface of the fortieth layer and the thirty ninth layer is minus). FIG. 11 shows the admittance locus for the forty first layer to the fortieth layer, at 578 nm (the optical admittance attainment point of the fortieth layer, in other words, the imaginary part of the optical admittance at the interface of the fortieth layer and the thirty ninth layer is plus). FIG. 12 shows the admittance locus for the forty first layer to the fortieth layer, at 640 nm (the optical admittance attainment point of the fortieth layer, in other words, the imaginary part of the optical admittance at the interface of the fortieth layer and the thirty ninth layer is plus). FIG. 13 shows the admittance locus for the forty first layer to the fortieth layer, at 700 nm (the optical admittance attainment point of the fortieth layer, in other words, the imaginary part of the optical admittance at the interface of the fortieth layer and the thirty ninth layer is plus).

Figure 14:
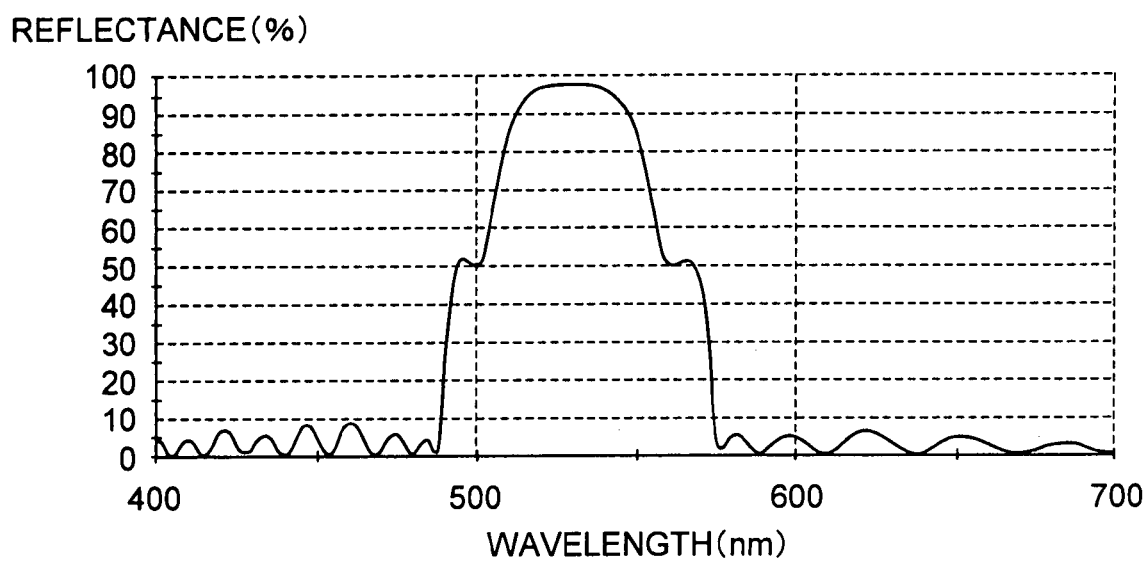
FIG. 14 is a diagram showing reflectance characteristics in the fourth embodiment.

Furthermore, FIG. 14 shows the reflectance characteristics according to the fourth embodiment.

Moreover, in each of the embodiments described above, it is desirable that the angle of incidence on the multi layer film section is used in a range of 40 degrees to 50 degrees. Accordingly, an effect that it is possible to manufacture an optical component for which the range of the angle of incidence is from 40 degrees to 50 degrees which is difficult to achieve, is shown.

Moreover, in each of the embodiments described above, it is desirable that a material which is selected from $TiO_2$, $Ta_2O_5$, $ZrO_2$, $Hf_2$, $CeO_2$, $Y_2O_3$, $La_2O_3$, $AlO_3$, $LaTiO_3$, $La_{2X}Al_{2Y}O_{3(X+Y)}$, $SiO_2$, and $MgF_2$ is used. By using such material, an effect that it is possible to manufacture the component in reality is shown.

Figure 15:
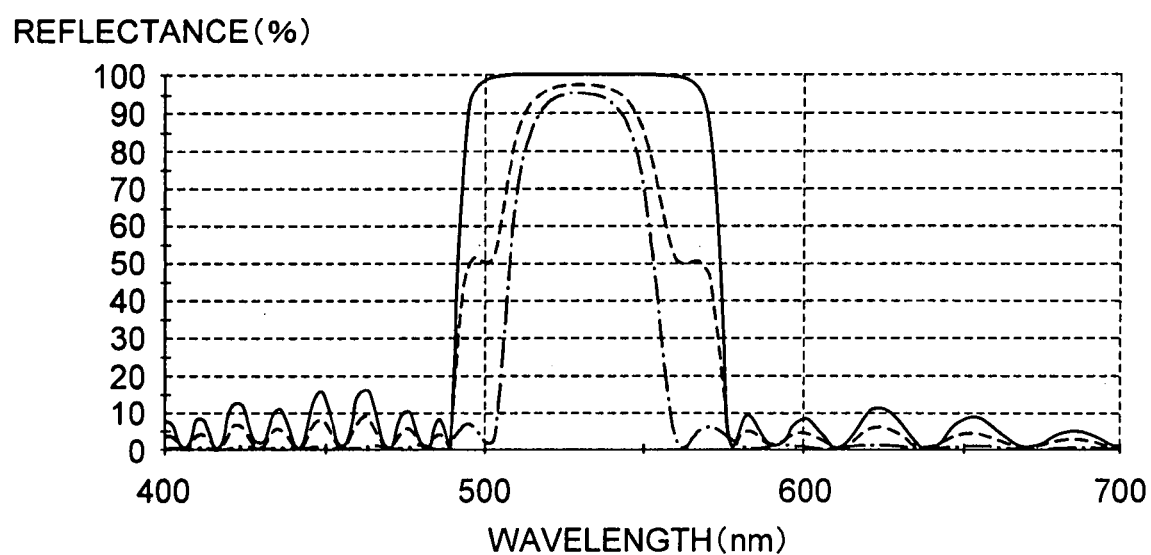
FIG. 15 is another diagram showing the reflectance characteristics in the fourth embodiment.
Figure 16:
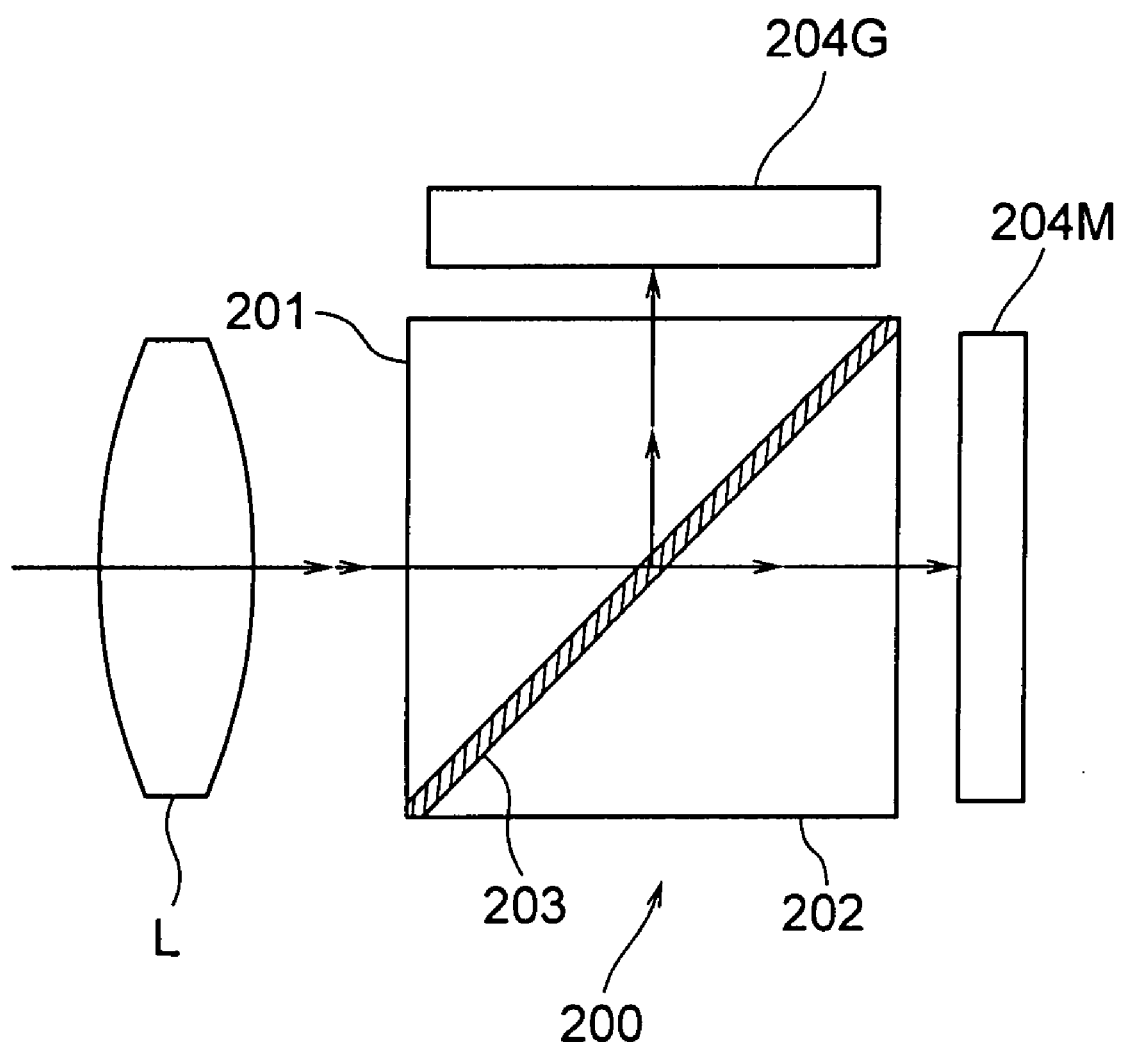
FIG. 16 is a diagram showing a schematic structure of a two-plate unit of a fifth embodiment.

In each of the embodiments described above, it is desirable that in the first wavelength band, a ratio p/s of an integral value s of an amount of reflected light of S polarization and an integral value p of an amount of reflected light of P polarization is not less than 0.4. FIG. 15 shows the reflectance characteristics in the fourth embodiment for example. A solid line indicates reflectance characteristics of the S polarization, an alternate long and short dash line indicates reflectance characteristics of the P polarization, and a dashed line indicates average reflectance characteristics.

In the first wavelength band (Green: range of 488 nm to 578 nm), the ratio p/s of the integral value s of the amount of reflected light of S polarization and the integral value p of the amount of reflected light of P polarization is 0.532. Thus, the abovementioned condition that the ratio is not less than 0.4 is satisfied. This condition becomes an essential condition in a case of using an optical instrument which uses the random polarization. By satisfying this condition, an effect that it can be used in an instrument which uses the random polarization is shown.

Fifth Embodiment

Next, a two-plate unit 200 according to a fifth embodiment of the present invention will be described below. Since a structure of an optical component 201, an optical component 202, and a multiple layer film section 203 is similar to the structures described in each of the embodiments described above, the description to be repeated is omitted.

A lens L is disposed near an end surface of the two-plate unit 200, on a side of incidence of light. Moreover, a CCD (charge coupled device) 204M for magenta and a CCD 204G for green are disposed respectively near an end surface of the two-plate unit 200, on a side of emergence of light.

The multiple layer film section 203 allows to pass the red color light R and the blue color light B out of the light which has passed through the lens L. Light in which the red color light R and the blue color light B are mixed becomes magenta light. The magenta light is detected by the CCD 204M for magenta. Moreover, the multiple layer film section 203 reflects the green color light G out of the light which has passed through the lens L. The green color light G is detected by the CCD 204G for green.

Thus, by mounting the optical device of the present invention on the two-plate unit 200, an effect that it is possible to photograph a highly defined image is shown.

Sixth Embodiment

Figure 17:
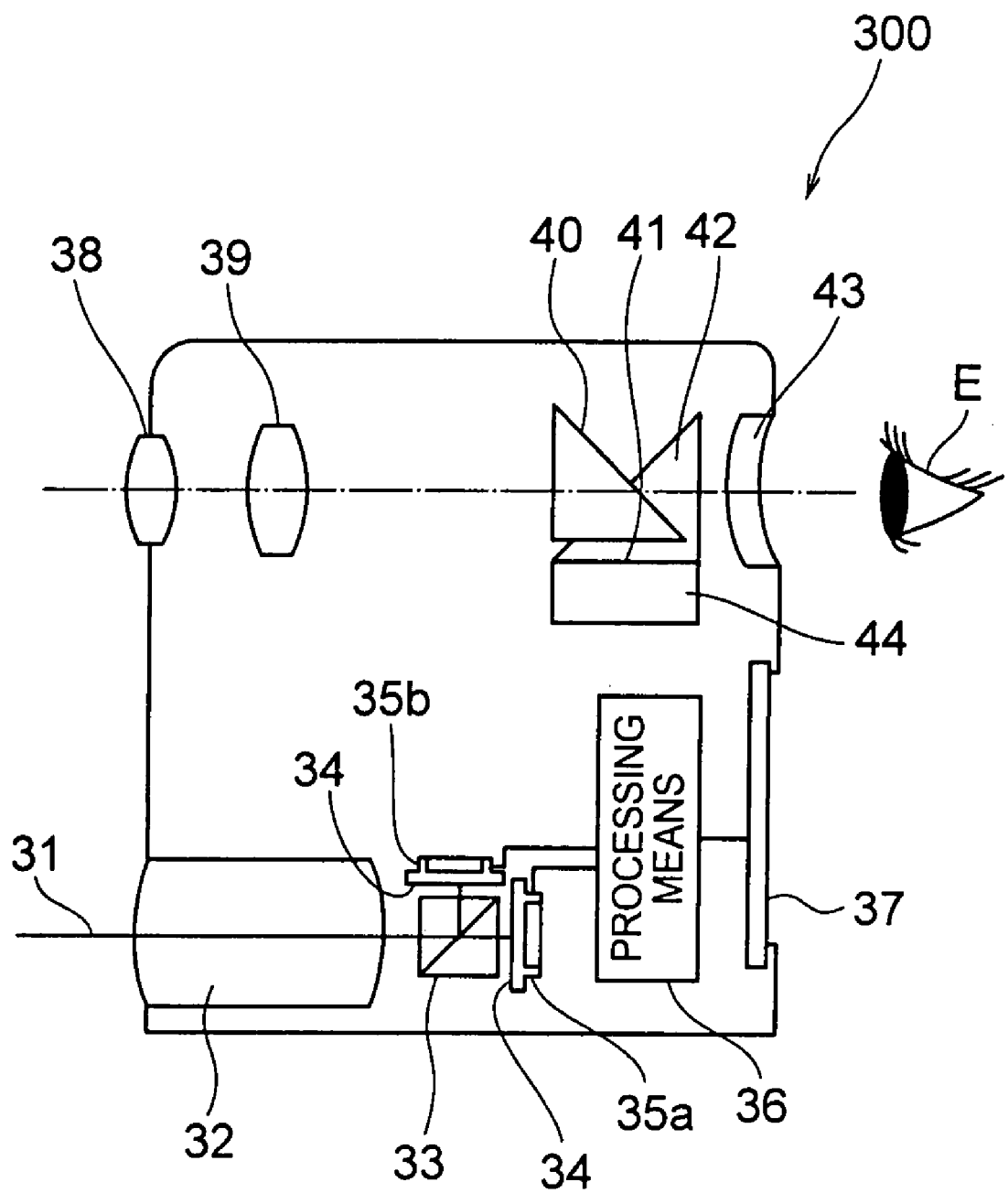
FIG. 17 is a diagram showing a schematic structure of an electronic camera of a sixth embodiment.

Next, an imaging instrument according to a sixth embodiment of the present invention will be described below. This imaging instrument is an electronic (digital) camera, for example. FIG. 17 is a cross-sectional view showing a structure of an electronic camera 300. The electronic camera 300, in a case of this example, includes a photographic objective optical system 32 having a photographic optical path 31, a finder objective optical system 39, a shutter which is not shown in the diagram, a flash which is not shown in the diagram, and a liquid crystal display monitor 37.

When a shutter which is disposed at an upper portion of the electronic camera 300 is pressed, in conjunction with this, an image is photographed through the photographic objective optical system 32. Out of light which forms an object image formed by the photographic objective optical system 32, an optical device 33 in each of the abovementioned embodiments allows the blue color light B and the red color light R to pass. Moreover, the green color light G is reflected by the optical device 33.

An image by the blue color light B and the red color light R is formed on an imaging surface 34 of a CCD 35a. An image by the green color light G is formed on an imaging surface 34 of the CCD 35b. An object image which is formed upon receiving light at the CCD 35a and 35b is displayed as an electronic image on the liquid crystal display monitor 37 which is provided on a rear surface of the camera, via a processing means 36.

Moreover, a memory etc. is disposed in the processing means 36, and it is possible to record an electronic image which is photographed. The memory may be provided separately from the processing means 36, or an arrangement may be made to perform electronic recording and writing by a flexible disc etc.

Furthermore, the finder objective optical system 39 is disposed on an optical path for finder. A cover lens 38 is formed at a side of incidence of the finder objective optical system 39. The cover lens 38 which is used as a cover member is a lens having a positive power, and magnifies an angle of view.

An object image formed by the finder objective optical system 39 is formed on a field frame 41 of a Porro prism 42 which is an image erecting member. The field frame 41 separates a space between a first reflecting surface 40 and a second reflecting surface 44 of the Porro prism 42, and is disposed between the first reflecting surface 40 and the second reflecting surface 44. On a rear side of the Porro prism 42, an ocular optical system 43 which guides an erect non-reverse image to an eyeball E of an observer is disposed.

The electronic camera 300 structured in such manner uses the optical device and the two-plate unit described in each of the abovementioned embodiments, and has an imaging unit which is capable of taking a highly defined image. Accordingly, an effect that it is possible to improve performance of the imaging instrument is shown.

Seventh Embodiment

Figure 18:
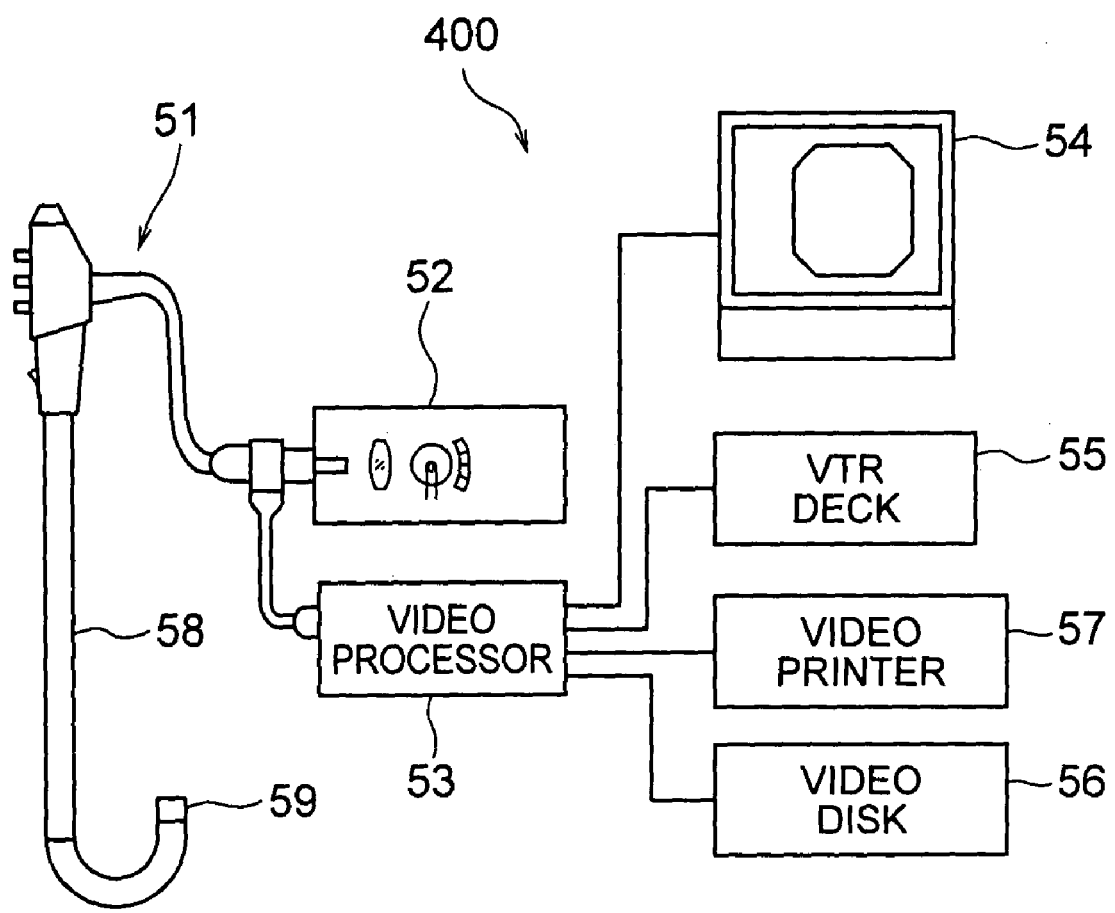
FIG. 18 is a diagram showing a system structure of an electronic endoscope of a seventh embodiment.

Next, an endoscope according to a seventh embodiment of the present invention will be described below. FIG. 18 shows a structure of a system 400 of an electronic endoscope 51. In a case of the seventh embodiment, an objective optical system for observation 60, in the electronic endoscope 51 includes the optical device of the first embodiment to the fourth embodiment, and an optical device 61 having a form substantially similar to the optical device of the first embodiment to the fourth embodiment.

The system 400 of the electronic endoscope 51, as shown in FIG. 18, includes an electronic endoscope 51, a light source unit 52 which supplies light, a video processor 53 which performs a signal processing corresponding to the electronic endoscope 51, a monitor 54 which displays a video signal output from the video processor 53, a VTR deck (video tape recorder) 55 and a video disc 56 which are connected to the video processor 53, and which record the video signal etc., a video disc 56, and a video printer 57 which prints out the video signal as a video image.

Figure 19:
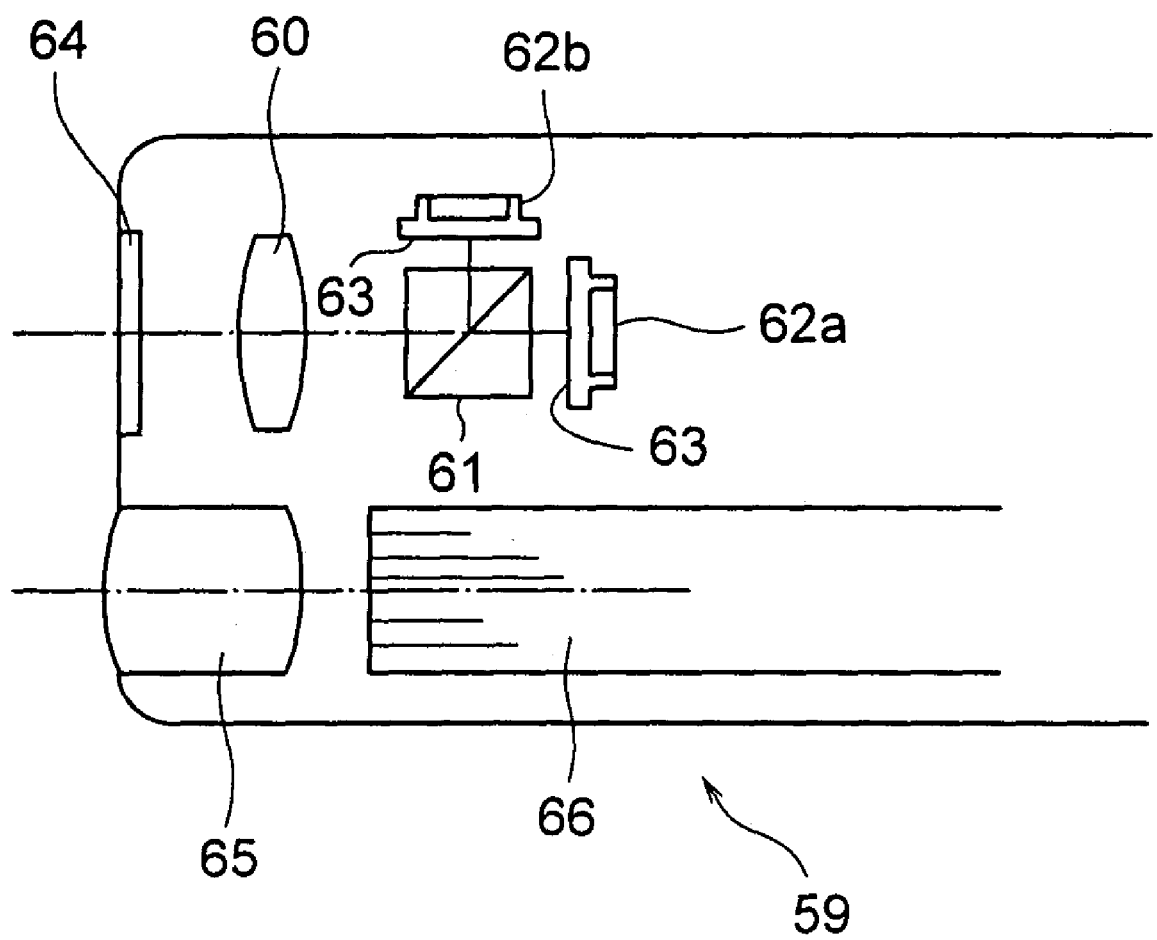
FIG. 19 is a diagram showing a schematic structure of the electronic endoscope of the seventh embodiment.

FIG. 19 shows a structure of a front end portion 59 of an inserting section 58 in the electronic endoscope 51. A light beam irradiated from the light source unit 52 is guided by light-guiding fiber bunch 66. The guided light illuminates a part to be observed, by an illuminating objective optical system Further, light from the part to be observed is formed as an object image by an objective optical system for observation 60, via a cover member 64. Out of light which forms the object image, the blue color light B and the red color light R for example, are allowed to pass, by the optical device 61. Moreover, the green color light G is reflected by the optical device 61.

An image by the blue color light B and the red color light R is formed on an imaging surface 63 of a CCD 62a. An image by the green color light G is formed on an imaging surface 63 of the CCD 62b. An object image is converted to a video signal by the CCD 62a and the CCD 62b.

The video signal is displayed directly on the monitor 54, and is recorded in the VTR deck 55 and the video disc 56, by the video processor 53 shown in FIG. 18.

The electronic endoscope structured in such manner includes the optical device and a small size two-plate unit, described above. Therefore, an effect is shown that it is possible to take a highly defined image by assembling the optical device and the two-plate unit at a front end of the endoscope.

Thus, the optical device according to the present invention is suitable for a filter with a small separation of the P polarization and the S polarization.

According to the present invention, an effect is shown that it is possible to provide an optical device including a multiple layer film filter which separates divides light according to each wavelength band, and which suppresses a divergence of a P polarization and an S polarization when the light is incident on the multiple layer film filter at an angle, and has characteristics of a favorable reflectance for a random polarization, and has characteristics of suppressing a ripple of a pass band. Moreover, according to the present invention, an effect is shown that it is possible to provide a two-plate unit, an imaging instrument, and an endoscope which includes this optical device.

What is claimed is:

1. An optical device comprising:
    a first optical member having a prism shape and a second optical member having a prism shape formed of a medium having a refractive index greater than 1; and
    a multiple layer film section which is provided between an optical surface of the first optical member and an optical surface of the second optical member, wherein
    the multiple layer film section has a structure in which, at least two types of thin film layers namely a first thin film layer, and a second thin film layer which has a refractive index higher than a refractive index of the first thin film layer, are stacked alternately, and
    where a refractive index of the first optical member and the second optical member is let to be $n_S$,
    the refractive index of the first thin film layer is let to be $n_L$,
    the refractive index of the second thin film layer is let to be $n_H$, and
    an angle between a normal of a plane of the multiple layer film section and a light beam which is incident is let to be $\theta$ respectively, $\theta$ being equal to 45 degrees, then the following conditional expressions (1) and (2) are satisfied $$1 \neq \frac{\sqrt{\frac{n_L^2 \times n_H^2}{(n_L^2 + n_H^2)\sin^2\theta}}}{n_S} \quad (1)$$

$$1.28 \leq \frac{\sqrt{\frac{n_L^2 \times n_H^2}{(n_L^2 + n_H^2)\sin^2\theta}}}{n_S} \quad (2)$$

and
    at the multiple layer film section, out of the light incident, a light of a first wavelength band is allowed to be reflected, and a light of a second wavelength band which is shorter than the first wavelength band, and a light of a third wavelength band which is longer than the first wavelength band are allowed to pass;
    wherein in the first wavelength band, a ratio p/s of an integral value s of an amount of reflected light of S polarization and an integral value p of an amount of reflected light of P polarization is not less than 0.4.

2. The optical device according to claim 1, wherein
    the multiple layer film section is formed of at least ten thin film layers, and
    from among all the thin film layers, at least fifty percent of the layers include one of the first thin film layer and the second thin film layer.

3. The optical device according to one of claims 1 and 2, wherein the multiple layer film section is made of a material which is selected from among $TiO_2$, $Ta_2O_5$, $ZrO_2$, $Hf_2$, $CeO_2$, $Y_2O_3$, $La_2O_3$, $AlO_3$, $LaTiO_3$, $La_{2X}Al_{2Y}O_{3(X+Y)}$, $SiO_2$, and $MgF_2$.

4. A two-plate unit comprising:
    the optical device according to one of claims 1 and 2.

5. An imaging instrument which performs imaging of one of a moving picture, a still picture, and both the moving picture and the still picture, in which the optical device according to one of claims 1 and 2 is used.

6. An endoscope comprising:
    the optical device according to one of claims 1 and 2.

7. The optical device according to one of claims 1 and 2, wherein the first thin film layer is made of $Y_2O_3$, and the second thin film layer is made of $Ta_2O_5$.

8. The optical device according to claim 7, wherein the first optical member and the second optical member include optical glass having the refractive index of 1.521.

9. The optical device according to one of claims 1 and 2, wherein a most outer layer and a bottom layer of the multiple layer film section are made of $SiO_2$, the first thin film layer is made of $Y_2O_3$, and the second thin film layer is made of $Ta_2O_5$.

10. The optical device according to claim 9, wherein the first optical member and the second optical member include optical glass having the refractive index of 1.470.

\* \* \* \* \*